United States Patent
Lowell

(10) Patent No.: US 7,793,287 B2
(45) Date of Patent: Sep. 7, 2010

(54) RUNTIME VIRTUALIZATION AND DEVIRTUALIZATION OF I/O DEVICES BY A VIRTUAL MACHINE MONITOR

(75) Inventor: David E. Lowell, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1746 days.

(21) Appl. No.: 10/676,922

(22) Filed: Oct. 1, 2003

(65) Prior Publication Data

US 2005/0076155 A1    Apr. 7, 2005

(51) Int. Cl.
    *G06F 9/455*    (2006.01)
(52) U.S. Cl. .................................................. 718/1
(58) Field of Classification Search .................... 718/1; 709/1; 703/27; 710/260; 717/127
    See application file for complete search history.

(56) References Cited

U.S. PATENT DOCUMENTS

| | | | |
|---|---|---|---|
| 4,253,145 A | 2/1981 | Goldberg | |
| 4,742,447 A * | 5/1988 | Duvall et al. ................... | 718/1 |
| 4,843,541 A | 6/1989 | Bean et al. | |
| 5,437,033 A | 7/1995 | Inoue et al. | |
| 5,522,075 A | 5/1996 | Robinson et al. | |
| 5,896,141 A | 4/1999 | Blaho et al. | |
| 5,991,893 A | 11/1999 | Snider | |
| 6,075,938 A * | 6/2000 | Bugnion et al. ................ | 703/27 |
| 6,256,657 B1 | 7/2001 | Chu | |
| 6,397,242 B1 | 5/2002 | Devine et al. | |
| 6,496,847 B1 | 12/2002 | Bungnion et al. | |
| 6,785,886 B1 | 8/2004 | Lim et al. | |
| 6,789,156 B1 | 9/2004 | Waldspurger | |
| 6,795,966 B1 | 9/2004 | Lim et al. | |
| 6,832,270 B2 | 12/2004 | Das Sharma et al. | |
| 6,961,941 B1 * | 11/2005 | Nelson et al. ................ | 719/319 |
| 6,968,398 B2 * | 11/2005 | Davis et al. ..................... | 710/3 |
| 6,978,018 B2 | 12/2005 | Zimmer | |
| 7,082,598 B1 * | 7/2006 | Le et al. ...................... | 717/127 |
| 7,225,441 B2 | 5/2007 | Kozuch et al. | |
| 7,370,324 B2 | 5/2008 | Goud et al. | |
| 2002/0083110 A1 * | 6/2002 | Kozuch et al. .................. | 709/1 |
| 2003/0097393 A1 * | 5/2003 | Kawamoto et al. ............. | 709/1 |
| 2004/0103299 A1 | 5/2004 | Zimmer et al. | |
| 2004/0117532 A1 * | 6/2004 | Bennett et al. .............. | 710/260 |
| 2004/0128670 A1 | 7/2004 | Robinson et al. | |
| 2004/0230794 A1 | 11/2004 | England et al. | |
| 2005/0076155 A1 | 4/2005 | Lowell | |
| 2005/0076156 A1 | 4/2005 | Lowell | |
| 2005/0076324 A1 | 4/2005 | Lowell et al. | |
| 2005/0081212 A1 | 4/2005 | Goud et al. | |
| 2005/0091354 A1 | 4/2005 | Lowell et al. | |
| 2005/0091365 A1 | 4/2005 | Lowell et al. | |

OTHER PUBLICATIONS

Non-Final Office Action in U.S. Appl. No. 11/676,557, U.S.P.T.O., pp. 1-45 and Notice of References Cited (Oct. 21, 2008).

(Continued)

*Primary Examiner*—Li B Zhen
*Assistant Examiner*—Eric C Wai

(57) ABSTRACT

A virtual machine monitor can be used to commence virtualization of an I/O device of a computer at runtime. The virtual machine monitor can also be used to devirtualize an I/O device of a computer at runtime.

56 Claims, 7 Drawing Sheets

OTHER PUBLICATIONS

Goldberg, Robert P. "Survey of Virtual Machine Research",1974, Computer, p. 34-35.

Shriver et al, "An Implementation Scheme for a Virtual Machine Monitor to be Realized on User- Microprogrammable Minicomputers," 1976, ACM, pp. 226-332.

Robin et al, "Analysis of the Intel Pentium's Ability to Support a Secure Virtual Machine Monitor," 2000, USENIX.

Sugerman et al "Virtualizing I/O Devices on Vmware Workstation's Hosted Virtual Machine Monitor" 2001, USENIX.

U.S. Appl. No. 10/676,557, Office Action dated Oct. 21, 2008, pp. 1-45 with attachments.

U.S. Appl. No. 10/676,557, Office Action dated Apr. 16, 2009, pp. 1-46 with attachments.

U.S. Appl. No. 10/676,557, Office Action dated Apr. 17, 2007, pp. 1-46 with attachments.

U.S. Appl. No. 10/677,159, Office Action dated Apr. 20, 2009, pp. 1-26 with attachments.

U.S. Appl. No. 10/677,159, Office Action dated Apr. 8, 2008, pp. 1-15 with attachments.

U.S. Appl. No. 10/677,159, Office Action dated Oct. 6, 2008, pp. 1-17.

* cited by examiner

RUNTIME VIRTUALIZATION AND DEVIRTUALIZATION OF I/O DEVICES BY A VIRTUAL MACHINE MONITOR

BACKGROUND

A virtual machine monitor ("VMM") creates an environment that allows multiple operating systems to run simultaneously on the same computer hardware. In such an environment, applications written for different operating systems (e.g., Windows, Linux) can be run simultaneously on the same hardware.

The VMM is loaded during bootup of the computer and receives control of the hardware at boot time. The VMM maintains hardware control until the computer is shut down.

Running an operating system on a VMM involves virtualizing one or more of the following types of hardware at bootup: memory, I/O devices, and CPU(s). CPUs can be virtualized in the traditional way: the hardware is configured to trap when an operating system ("OS") executes a privileged instruction, and the VMM simulates that instruction to maintain the illusion that the operating system has sole control of the hardware. To virtualize memory, the VMM typically manages memory translation in order to translate between the OS's use of physical memory, and the real "machine" memory present in hardware.

I/O virtualization typically involves two levels of device drivers, one in the OS, and one in the VMM. Drivers in each level provide their own interrupt handlers. In some systems, OS device drivers are designed with knowledge of the VMM drivers. In such systems, the OS device driver performs I/O by directly calling routines in the VMM driver. In other systems, the OS device driver is unaware of the VMM. In those other systems, the driver in the OS attempts to perform I/O as if that driver controlled the I/O device, but the VMM intercepts those attempts and instead performs the I/O on that driver's behalf, using the VMM device driver. I/O performed in this manner is called "emulated I/O." When interrupts from an I/O device occur, interrupt handlers in the VMM drivers get control first. They process the interrupt, and then, as needed, deliver the interrupt to the appropriate handler among the OS's device drivers.

Virtualizing the hardware adds overhead to the computer. For example, intercepting the I/O instructions performed by the OS drivers and using two levels of interrupt handlers slow the OS's normal I/O processing.

Since the VMM virtualizes the hardware from bootup to shutdown, overhead is incurred even when virtualization is not necessary (for example, when only a single OS instance is running on the hardware). Thus the VMM can add unnecessary overhead to the computer.

It would be desirable to reduce the unnecessary overhead.

SUMMARY

According to one aspect of the present invention, virtualization of an I/O device of a computer is commenced at runtime. According to another aspect of the present invention, devirtualization of the I/O device is commenced at runtime.

Other aspects and advantages of the present invention will become apparent from the following detailed description, taken in conjunction with the accompanying drawings, illustrating by way of example the principles of the present invention.

DETAILED DESCRIPTION

Figure 1:
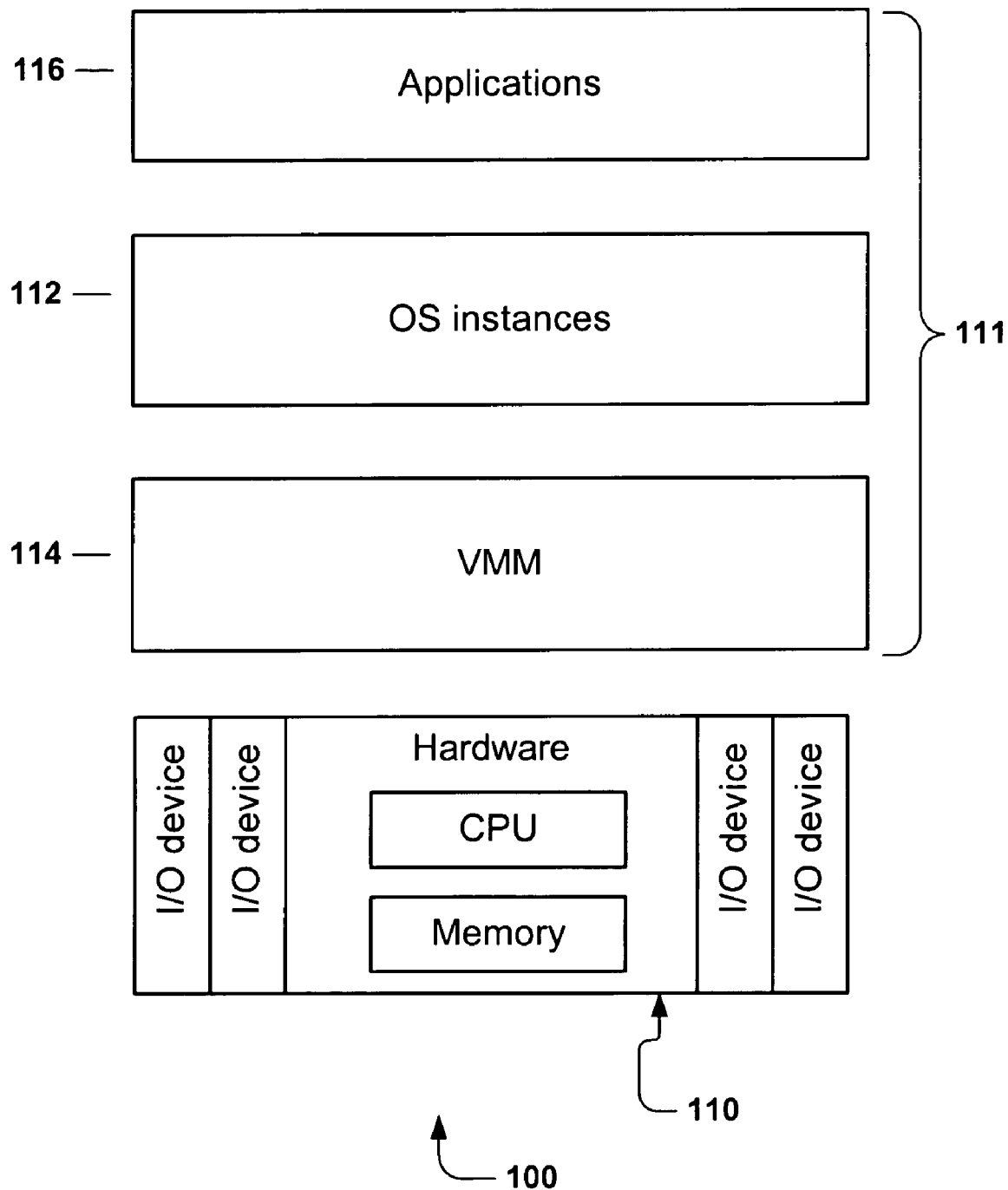
FIG. 1 is an illustration of hardware and software layers of a computer in accordance with an embodiment of the present invention.

As shown in the drawings for purposes of illustration, the present invention is embodied in a computer that can run a virtual machine monitor. The computer is not limited to any particular type. The computer could be, for example, a file server, web server, workstation, mainframe, personal computer, personal digital assistant (PDA), print server, or network appliance. The computer can be contained in a single box, or distributed among several boxes.

FIG. 1 shows different layers of an exemplary computer 100. The computer 100 has a raw hardware layer 110 and a software layer 111. The raw hardware layer 110 typically includes a central processing unit (CPU), memory and I/O devices. Exemplary I/O devices include, without limitation, network adapters, SCSI controllers, video cards, host bus adapters, and serial port adapters. The memory refers to the memory that is internal to the computer 106 (e.g., internal memory cache, main system memory) as opposed to external storage devices such as disk drives.

The software layer 111 includes an OS or OS instances 112, a VMM 114, and applications 116. The VMM 114 runs between the raw hardware layer 110 and the operating system instances 112. The VMM 114 allows one or more operating system instances 112 to run simultaneously. Applications 116 are run on the OS or operating system instances 112. During execution, the software for the software layer 111 can be stored in "articles" such as the memory; and during distribution, the software can be stored in articles such as external storage devices, removable media (e.g., optical discs), etc.

If the virtual and physical devices are compatible, the VMM can commence virtualization of the I/O device at runtime. Such virtualization at runtime is referred to as "runtime virtualization of I/O devices." The VMM can also cease the virtualization of these I/O devices at runtime. Such cessation is referred to as "runtime devirtualization of I/O devices." Runtime is the period of normal execution of the operating system after boot and before shutdown.

Physical and virtual devices are considered compatible if they both provide the same device interface. For example, two different serial line communications devices that both implement the interface of the Motorola 16550 Universal Asynchronous Receiver Transmitter (UART) would be compatible. Thus VMM and OS drivers are designed for the same interface.

Figure 2:
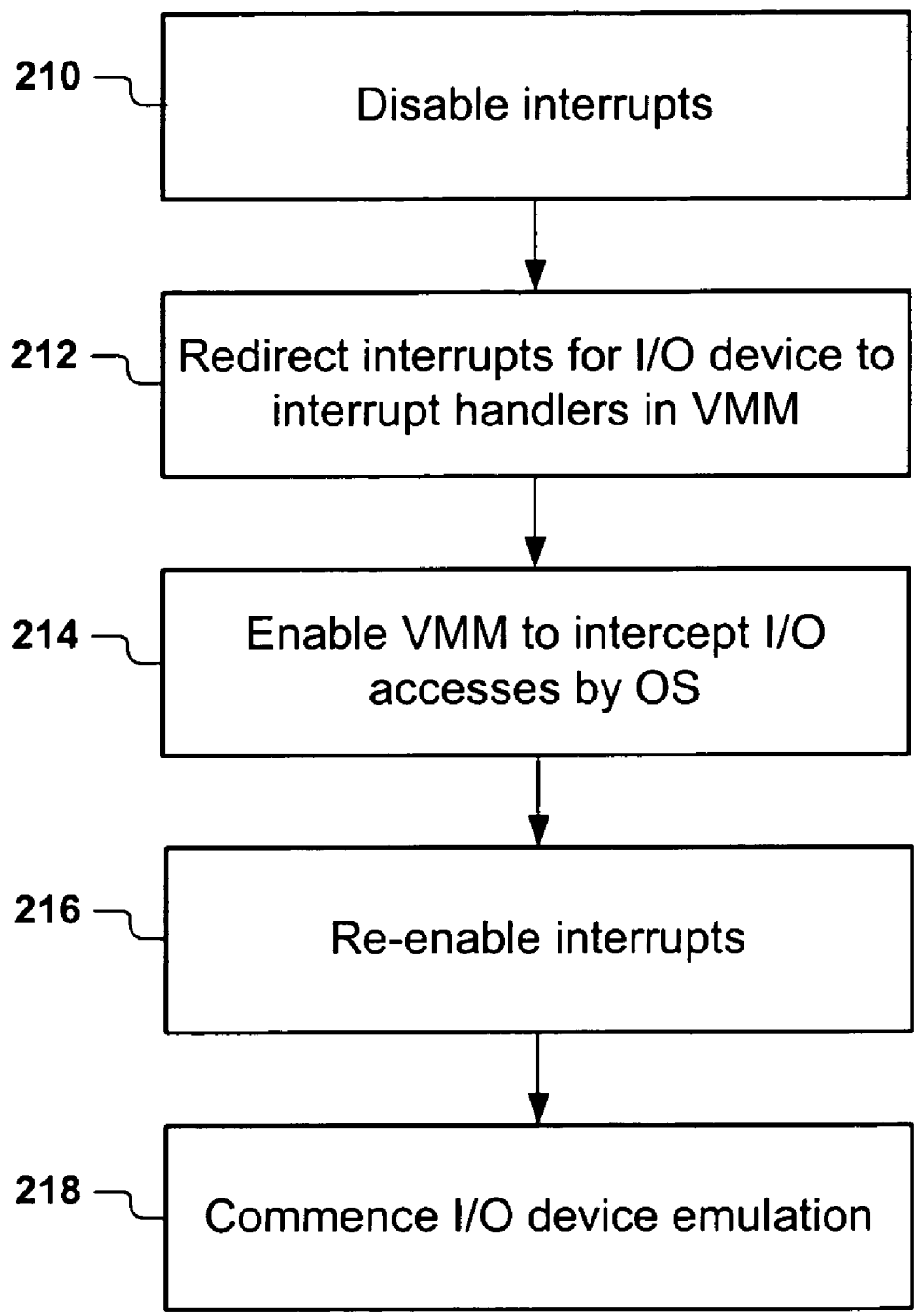
FIG. 2 is an illustration of a method of commencing virtualization of an I/O device at runtime in accordance with an embodiment of the present invention.

Reference is made to FIG. 2, which illustrates a method of commencing virtualization of an I/O device at runtime. It is assumed that the VMM already has control over the CPU to perform this method. For example, the VMM is run in a more privileged mode than the OS and gets control on key hardware traps. In the alternative, the VMM has already virtualized the CPU but not the I/O (see FIG. 6)

First, interrupts are disabled (210). Next, interrupts from the I/O device are redirected from the OS to interrupt handlers in the VMM (212). The interrupts can be redirected by modifying the interrupt vector table. Next, the hardware is configured so the VMM intercepts accesses to the I/O device by the OS (214). This can be done by causing accesses to control registers in the I/O device to trap to a handler in the VMM in the manner described below. Next, interrupts are re-enabled (216). Finally, the VMM may commence device emulation (218). From that point forth, the VMM can emulate I/O normally by reconstructing high-level I/Os, and performing those I/Os using its own driver for the device.

Figure 3:
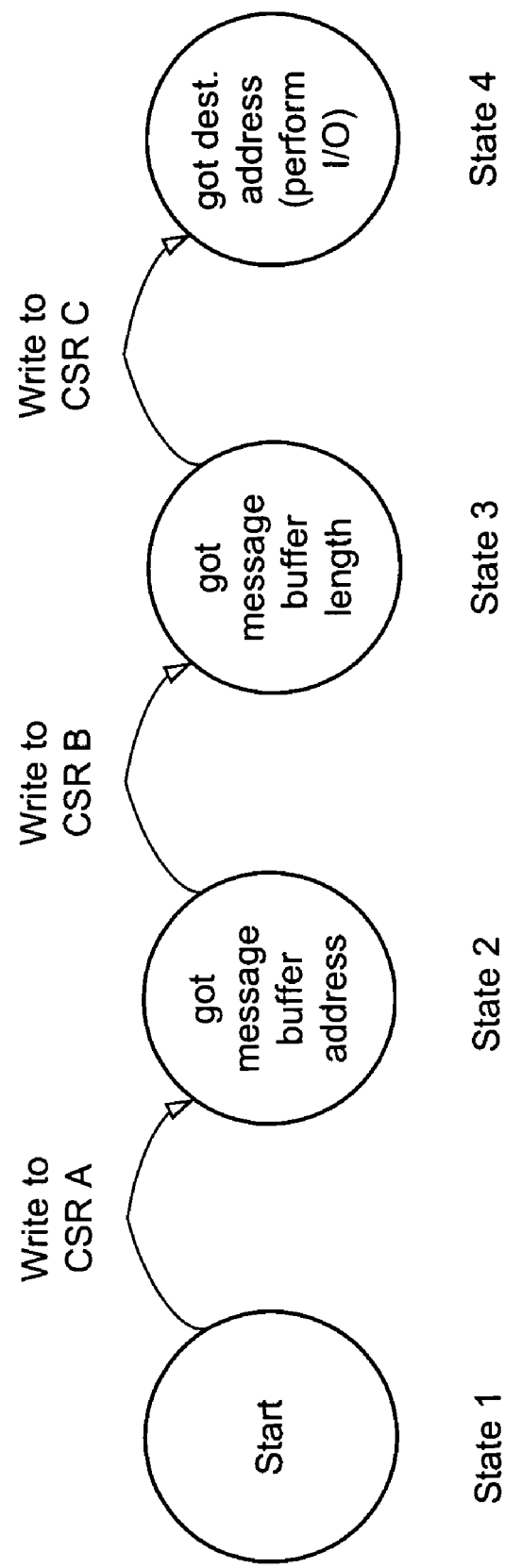
FIG. 3 is an illustration of an exemplary state machine for an I/O device.

The VMM can use a state machine to facilitate the emulation. An exemplary state machine for an idealized Ethernet card is illustrated in FIG. 3. The exemplary state machine has four states. The VMM can initialize the state machine for the Ethernet card to the start state (state 1) and update its state whenever the OS attempts to access a control status register (CSR) of the Ethernet card. The state machine allows the VMM to reconstruct "high-level I/Os" (e.g., send message) from a sequence of "low-level I/Os" (i.e. the individual CSR accesses needed to carry out the high-level I/Os). The sequence of low-level I/Os performed to complete a single high-level I/O is referred to as an "I/O sequence". When the state machine reaches an "end state" (state 4), the VMM performs the reconstructed, high-level I/O using its own driver for the Ethernet card.

Ideally, the I/O processing should be paused so that virtualization takes place between I/O sequences. The I/O processing can be paused, for example, by the use of a kernel module in the OS, an application that issues a special IOCTL command to the driver within the OS instance, or some other technique that can pause I/O processing by the OS device driver between high-level I/O accesses.

However, because the VMM commences emulation in the middle of the I/O device operation, the emulation could commence in the middle of an I/O sequence. In this case, the VMM watches the OS's I/O accesses in order to determine when the current I/O sequence ends. Once the VMM has identified an interval between I/O sequences, the VMM can put the state machine for the emulated device in a start state, and commence emulation. The VMM can watch more than one complete I/O sequence to accurately determine an I/O sequence boundary.

Figure 4:
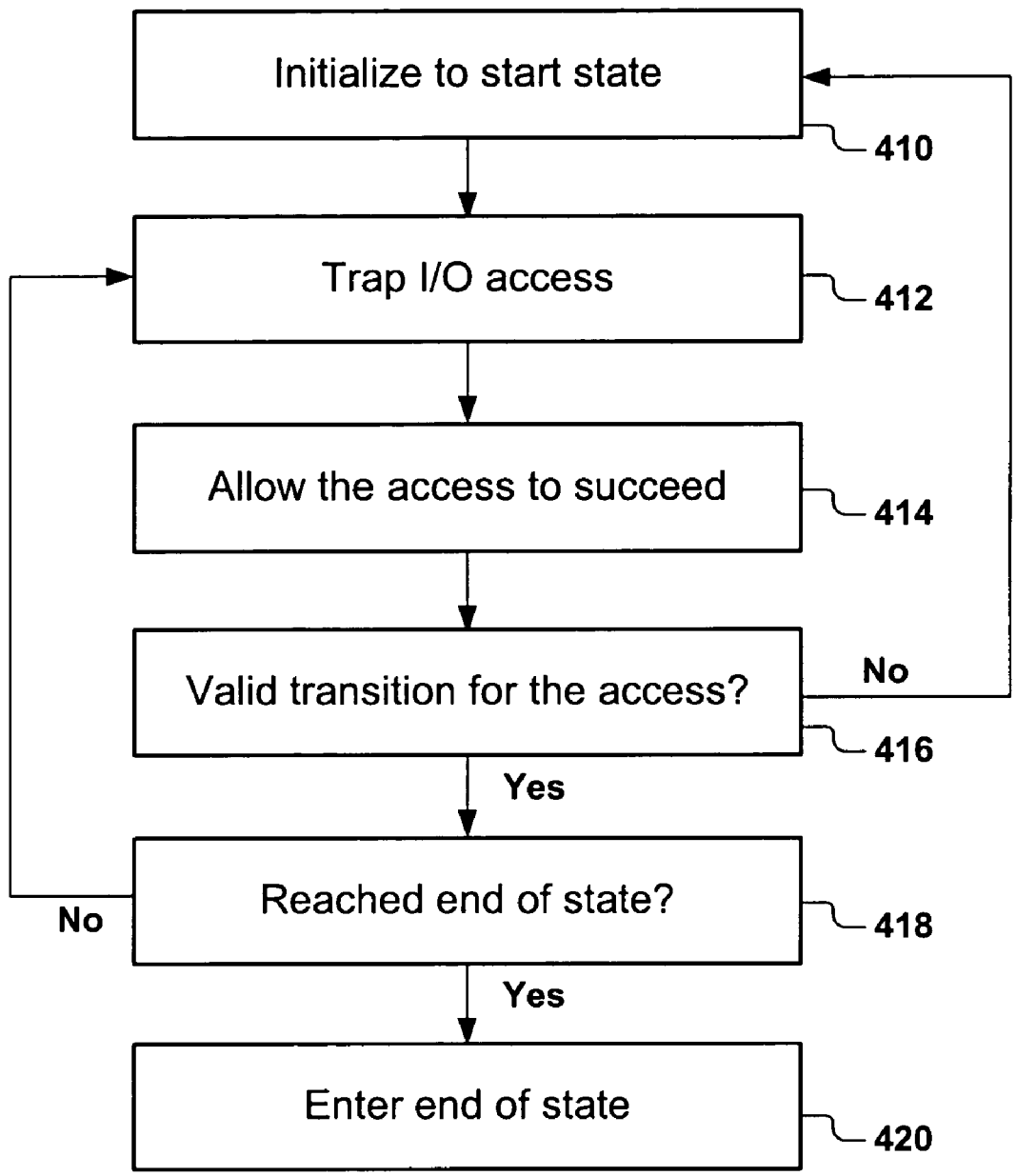
FIG. 4 is an illustration of a method of commencing I/O emulation in accordance with an embodiment of the present invention.

Reference is made to FIG. 4, which provides an example of how the VMM can use the state machine to determine the interval between I/O sequences. First, the VMM initializes the state machine to the-start state (410). Next, when the OS performs a low-level I/O access to the I/O device, that access traps to the VMM (412). The VMM then allows the trapping access to proceed (414) by emulating the instruction, single stepping the machine, etc. Next, the VMM checks whether there is a valid transition in the state machine from the current state for the trapped operation (416). If there is not, the VMM returns the state machine to the start state and awaits another trap (410). If there is a valid transition for the trapped operation, the VMM updates the state of the state machine as usual and checks whether the state machine has reached an end state (418). If an end state has not been reached, the VMM waits for another I/O operation on this device by the OS. If the state machine has reached an end state, the VMM resets the state machine to the start state (420). From that point on, the VMM can emulate I/O to the I/O device in a conventional manner by trapping future low-level I/O accesses by the OS (preventing those accesses from reaching the actual device), reconstructing high-level I/O accesses, and performing the high-level I/O accesses with its own driver.

The OS may issue an I/O access to the I/O device before virtualization, but that access later causes an interrupt to be delivered to the VMM after virtualization. From the moment interrupts are re-enabled (step 216 in FIG. 2), the VMM device driver for the virtualized I/O device handles interrupts specially. The VMM ensures that the OS is not stuck waiting for an interrupt that gets delivered to the VMM driver instead, and ensures that the VMM driver is not confused by an unexpected interrupt. This special handling can take several forms. For simple devices, the VMM driver can simply drop interrupts it wasn't waiting for. Alternatively, the VMM driver can forward some interrupts to the corresponding OS driver (for example, by invoking its handler for the interrupt). When the VMM driver first starts up (at the end of step 218 in FIG. 2), it may be able to query the state of the hardware to determine whether to expect any interrupts destined for the OS's driver, and forward them when they occur.

In certain cases, the VMM can pause new I/O processing by the OS long enough to allow any I/O activity initiated by the OS to finish generating interrupts, before allowing the driver in the VMM to take over. For example, between steps 216 and 218 of FIG. 2, the VMM could trap and emulate accesses to the I/O device's CSRs as needed to tell the OS the device is in a "busy" state and cannot accept new I/Os. Alternatively, if the OS driver has sufficient support, an application may be used to issue an appropriate IOCTL command to pause the OS driver. A kernel module in the OS may also be able to grab a lock associated with the I/O device, or in some other manner prevent the OS from initiating a new I/O access to the I/O device.

In most cases, the VMM can stop handling interrupts specially once it has started issuing I/Os to the I/O device and receiving its own interrupts from the I/O device.

An example of intercepting I/O accesses and performing emulation will now be provided. The I/O device in this example is an Ethernet card.

In this example, the VMM uses memory management to trap I/O accesses. The VMM maintains control over address translation. Modern microprocessors provide the ability to translate between the "virtual" addresses used by applications and the OS, and the "physical" addresses used by the hardware. When the OS or application accesses a virtual address, that address is translated into a physical address to allow the access to reach the real memory or I/O device present in hardware. This translation is typically managed by software (e.g. the OS, the VMM, the firmware, etc.), but performed on the fly by the CPU.

Virtual and physical memory are divided up into small chunks of memory called pages. The mapping of virtual pages to physical pages is typically represented by "page tables". Each page table contains a list of page table entries ("PTEs"), and each PTE typically maps one page of virtual address space to one physical page and defines its permissions (read, write, execute, etc.) for that page (on some architectures one PTE can map more than one page). As the OS and application access virtual addresses, those accesses are typically translated into physical accesses by a Translation Lookaside Buffer ("TLB") within the CPU. When a virtual address is accessed for which there is not a valid translation in the TLB, the appropriate PTE is read from the current page table, and then loaded into the TLB. When running on a VMM, this fill operation may be performed by a TLB miss handler in the VMM (on some platforms and architectures), or it may be performed by firmware (in other architectures), or the PALcode (in the HP Alpha Architecture), or it may be performed by the hardware (in still other architectures).

By managing the CPU's virtual memory translation, the VMM can cause the CPU to trap to the VMM when the OS accesses addresses associated with the I/O device's CSR. How the VMM causes these traps depends upon how translations for memory access are inserted. For example, if the VMM handles TLB misses, it can refuse to load the TLB with a PTE for the page containing that virtual address, or it can install a PTE for that page with permissions such that the desired accesses will fault. When the desired TLB miss trap or protection trap occurs, the VMM handler for that event can check to see whether the faulting address is one of interest, then handle-that access specially (for example, by emulating that access, modifying the result of that access, or translating that access to a different address).

If the VMM is not the party that handles TLB fills, the VMM can still cause particular virtual addresses to trap by configuring the CPU to use page tables defined by the VMM. By examining the OS page tables, the VMM can populate its page tables with the OS's translations as desired, but can also modify those translations as needed to cause the desired memory accesses to trap (e.g. by modifying the permissions for a particular page). The VMM can also add translations to its page tables to map or trap addresses beyond those the OS maps.

How the VMM traps the I/O accesses by the OS also depends on whether those accesses are to physical or virtual addresses. On many systems, the OS accesses I/O devices at physical addresses. Accesses to physical addresses normally bypass the TLB, making it difficult to trap them. However, most modern architectures have the ability to disable the direct addressability of physical memory and I/O space. By setting the appropriate bits in the CPU, the VMM can configure the CPU to treat accesses to physical I/O addresses as normal virtual accesses. After that, the VMM can manage those accesses in the manner described above.

Figure 5:
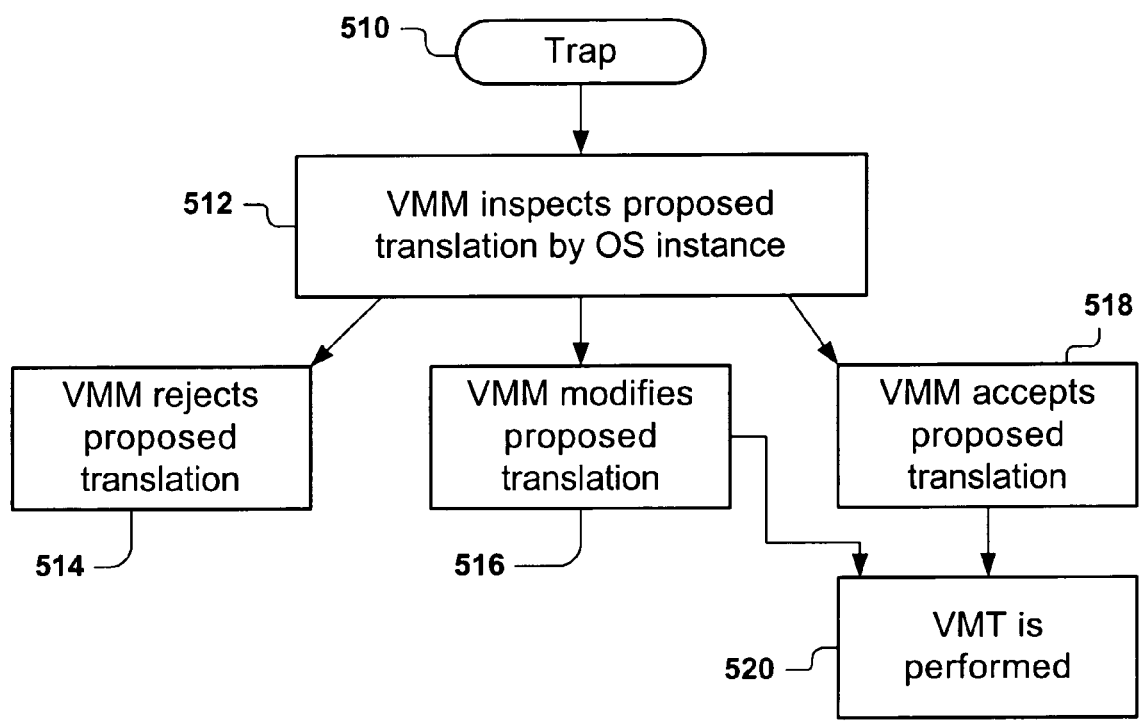
FIG. 5 is an illustration of a method of handling traps caused by I/O accesses in accordance with an embodiment of the present invention.

Reference is now made to FIG. 5. To trap the OS's I/O accesses to addresses the OS has mapped into virtual memory, the VMM examines, and possibly modifies, the virtual-to-physical mappings set up by the OS. The VMM can do so either when the OS modifies its page tables (by configuring hardware to trap When those modifications take place), or upon a TLB miss trap for the address in question (if the VMM handles TLB fills). When either type of trap occurs (510), the VMM inspects the proposed translation by the OS (512), for example, checking to see whether the OS maps a virtual page to a physical page in I/O space containing an I/O device that the OS instance is allowed to use. The VMM is free to reject the translation (514), possibly emulating some kind of protection fault. The VMM is also free to modify the proposed translation (516), by changing, for example, the protections associated with that mapping so that future accesses will cause a protection fault, or mapping that virtual page to a different physical page than the OS proposed. The VMM may also accept the proposed translation (518). After modifying or accepting the translation, the VMM allows virtual memory translation (VMT) to be performed using that translation (520), possibly by putting the translation into the TLB, or by storing it as a valid translation in the VMM's page tables.

Reference is made once again to FIG. 3, which shows the state machine for an idealized Ethernet card. The state machine for this idealized Ethernet device is simpler than the one that would be used for a real Ethernet card. Operating systems (or their device drivers) typically perform I/O by setting up the I/O in memory, then instructing the device to perform the actual I/O operation. For example, to send a message using the Ethernet card, the OS might assemble the message in memory, then perform three writes to the CSRs on the attached Ethernet card. The first write to CSR "A" tells the card the location in memory of the outgoing message. The second write, to CSR "B", tells the card the number of bytes in the message. The third write, to CSR "C", informs the card of the Ethernet address of the destination host. The Ethernet card, once it has received these three writes, has sufficient information to complete the OS's request, so it sends the message. The OS may also have to read control registers on the card, for example, to determine whether the card is buffering a received message, or whether it is ready to accept a new message to send.

In virtualizing an OS's access to an I/O device, the VMM observes the operations in an I/O sequence. Based on those accesses, the VMM reconstructs a high-level I/O, and then performs that high-level I/O on behalf of the OS. The VMM uses its own device driver to perform the high-level I/O operation.

The VMM may perform the high-level operation as follows. The VMM configures the hardware to trap when the OS reads or writes to the address of each CSR associated with that device. Each time the OS traps to the VMM while accessing the device, the VMM changes the state of its state machine for that device, then prevents that device load or store instruction from actually reaching the I/O device.

The state machine starts in State 1, the "start" state. When the OS attempts to write the address of the message buffer to CSR A, the VMM traps that access and updates the state machine to State 2 and files away the buffer's address in memory. When the VMM traps the second I/O write (for writing the number of bytes in the message to CSR B), the VMM updates the state machine to State 3, and files away the message length. When the OS attempts to write the destination Ethernet address to CSR C, and that access traps to the VMM, the VMM updates the state machine to State 4, and remembers that Ethernet address. Since state 4 is an "end" state for this state machine, the VMM now has sufficient information to perform the OS's high-level I/O (message send) using its own Ethernet driver. After initiating that I/O with its driver, the VMM can reset the state machine to the start state to prepare for another I/O sequence. State machines may have more than one start state, and more than one end state.

If the VMM observes an access to the Ethernet card other than the ones allowed by the legal state transitions in the state machine, the VMM handles the error appropriately, perhaps by dropping the I/O, or by emulating a "target abort" error condition.

To correctly emulate the Ethernet card, the VMM may also emulate interrupts from the Ethernet card. The VMM device driver can handle interrupts from the Ethernet card. After it has processed an interrupt, the VMM may choose to deliver an interrupt to the OS by executing a "jump" instruction to the appropriate interrupt handler in the OS.

The type of the virtualized device used by the OS does not have to match the type of device installed in the computer. For example, the VMM could tell the OS during the OS's resource discovery that the hardware contains a 3Com Ethernet card. The VMM could then employ a state machine compatible with that card to reconstruct the OS's network I/Os, but then perform the actual network I/Os using an Ethernet card having a device interface different from the 3Com device, using its own driver for the Intel card. However, the virtual and physical devices are compatible.

Figure 6:
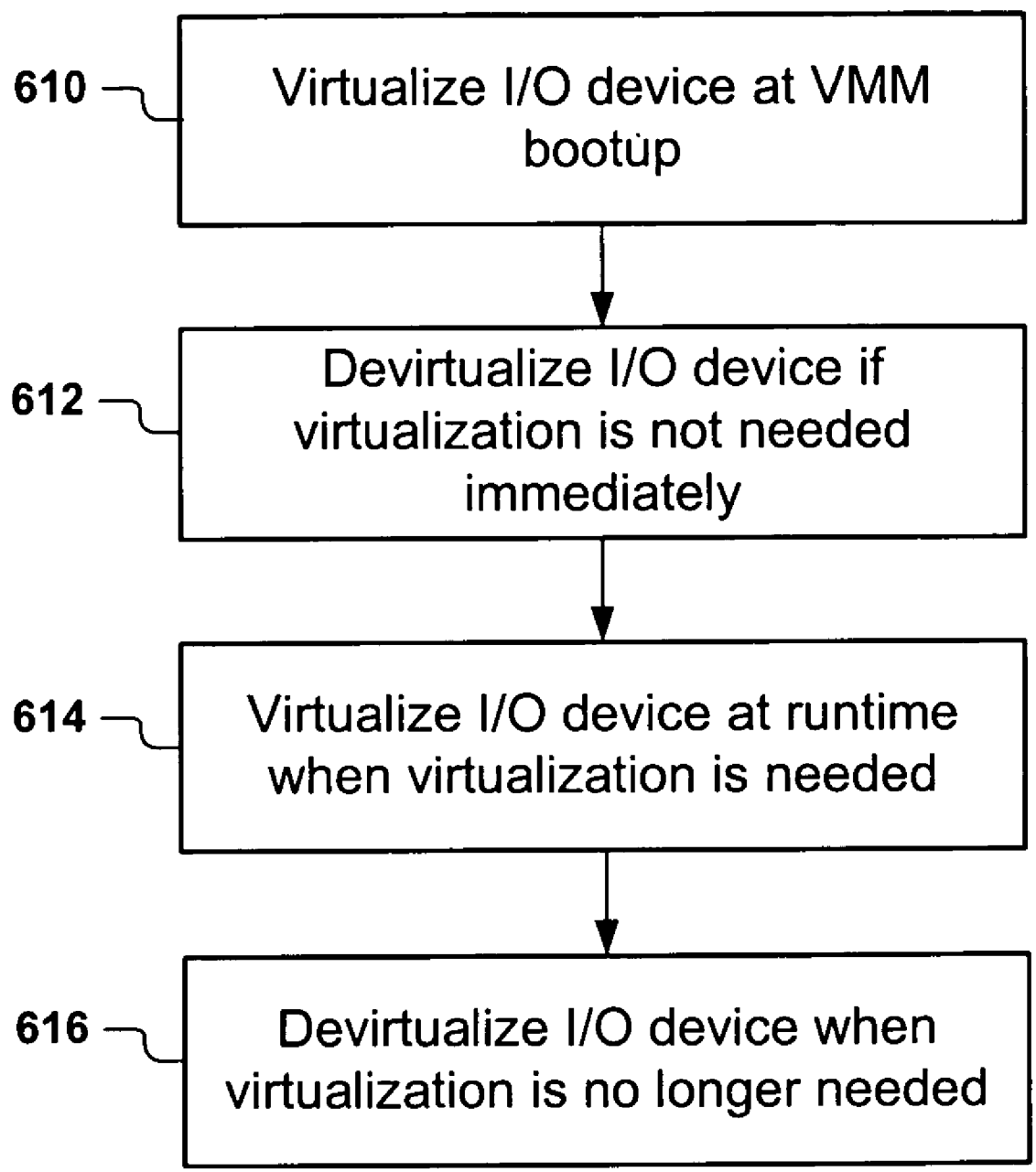
FIG. 6 is an illustration of performing virtualization and devirtualization in accordance with an embodiment of the present invention.

Reference is now made to FIG. 6. The VMM can also devirtualize the I/O device at runtime. The devirtualization includes stopping I/O device emulation at runtime.

The devirtualization can be performed after runtime virtualization, or it can be performed after virtualization at VMM bootup. For example, the I/O device can be virtualized at bootup of the VMM (610). If not used immediately, the I/O device can be immediately devirtualized (612) to reduce any unnecessary overhead associated with the virtualized I/O device. When it becomes necessary to virtualize the I/O device, the runtime virtualization is performed (614). When a virtualized I/O device is no longer needed, the I/O device is devirtualized again (616).

The decision to perform runtime virtualization and devirtualization can be made by a system administrator. The system administrator informs the VMM of the decision (e.g., using a GUI).

Figure 7:
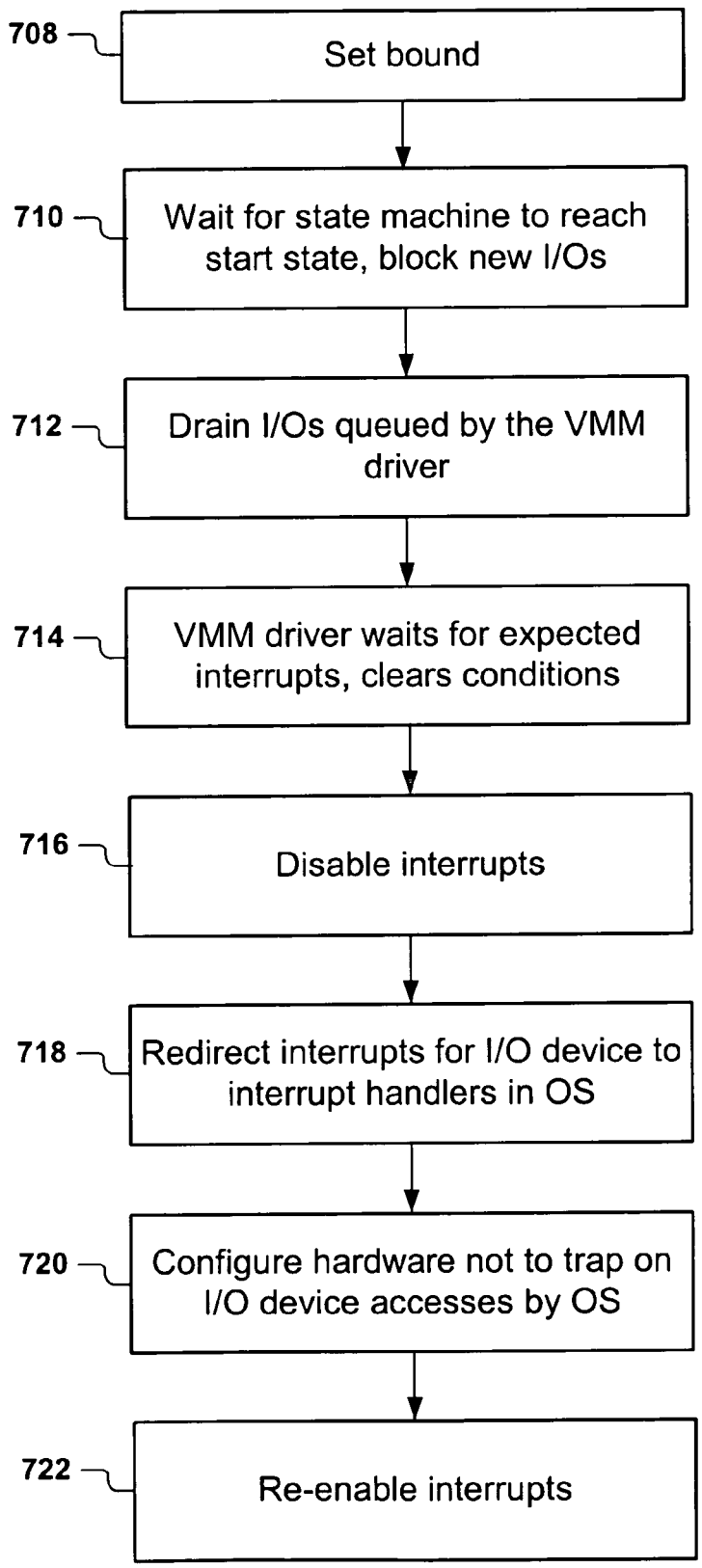
FIG. 7 is an illustration of performing runtime devirtualization of an I/O device in accordance with an embodiment of the present invention.

Reference is made to FIG. 7, which illustrates an exemplary method of devirtualizing an I/O device at runtime. The VMM postpones devirtualization until the state machine for the I/O device enters the start state, and blocks the OS from commencing a new I/O sequence (710). There are many possible ways the VMM can block the OS from commencing a new I/O sequence. As a first example, an application may be used to issue an appropriate IOCTL command to pause the driver, if the driver has the needed support. As a second example, a kernel module in the OS may grab a lock associated with the device in order to prevent new I/O sequence from being started. As a third example, the VMM may emulate the device as being either "busy" or in a "device not ready" state. As a fourth example, thee VMM may trap the first operation in a new I/O sequence, and simply block the entire OS. As a fifth example (an alternative to pausing I/O processing for the device), the VMM may trap and log the OS's I/O operations during devirtualization, and simply replay the log to the I/O-device once devirtualization is finished.

Next, the VMM waits for any I/Os to complete that were enqueued by the VMM device driver (712). The VMM driver then waits for any expected interrupts and clears the associated interrupt condition in the device (714). Interrupts are then disabled (716), and interrupts are redirected from the device to interrupt handlers in the OS (718). Next, the hardware is configured not to trap the OS's I/O accesses to the device, and to let them complete directly to the hardware (720). Since the VMM will no longer trap those I/O operations, completing this step stops I/O emulation and state machine processing. Finally, interrupts are re-enabled (722). From then on, the OS performs I/Os directly to the device, and receives its interrupts, without the intervention of the VMM. An alternative to redirecting the device's interrupts to handlers in the OS is for the handlers in the VMM to quickly invoke the OS's handlers, without extensive processing.

The VMM can set a limit on the amount of time the VMM will wait for the state machine to reach the start state (708). If the start state is not reached in that time, corrective steps may be taken such as resetting the I/O device.

During both virtualization and devirtualization, the VMM might save the mode of the I/O device. I/O devices often have different modes of operation. Consider a UART, which handles serial communication. Typical UARTs can operate in a mode in which characters are seven bits long, with even parity, and where the UART generates an interrupt when it receives a new character. Often, those same UARTs can also operate in a mode in which characters are eight bits long, with odd parity, and where the UART doesn't interrupt the CPU when a new character arrives (i.e. it is in "polling" mode). The particular mode of operation for the device is often configured by its driver.

When virtualizing or devirtualizing an I/O device at runtime, the mode of operation employed by a device's driver in the OS should match the mode employed by the driver in the VMM. The VMM device driver can either be designed to work in the same mode as the OS driver, or the VMM driver may query the device to learn its mode of operation and then adopt an appropriate mode of operation for itself.

Alternately, if the. VMM driver prefers to operate the device in a different mode from the mode employed by the OS's driver, it can query the mode of the I/O device during runtime virtualization, and save the mode in memory. After saving the mode, the VMM driver can reconfigure the device to the VMM's preferred mode of operation. Later, at devirtualization time, the VMM can restore the device to the OS's preferred mode of operation. For devices with multiple start states in their state machines, the VMM may choose which start state to employ when commencing emulation (during step 218 of FIG. 2) based on the configured mode of the I/O device.

Thus disclosed is a VMM that can reduce unnecessary overhead. An operating system need not be modified to run on the VMM or designed for that purpose, but instead may be a commodity operating system without special support for running in a virtual machine (such as Microsoft Windows, Linux, Tru64 Unix, etc.). Similarly, the raw hardware layer need not provide special support for the VMM. The VMM can work on commodity hardware not having features that help or accelerate virtualization (such as Intel x86, Intel Itanium, and HP Alpha processors).

The runtime virtualization and devirtualization were described above for a single I/O device. However, the runtime virtualization and devirtualization can be performed on more than one I/O device at a time.

The present invention is not limited to the specific embodiments described and illustrated above. Instead, the present invention is construed according to the claims that follow.

The invention claimed is:

1. In a computer including an I/O device, a method comprising using a virtual machine monitor to commence virtualization of the I/O device at runtime, wherein runtime is a period of execution in the computer after boot and before shutdown of the computer, wherein virtualization of the I/O device is performed by:

redirecting interrupts for the I/O device to interrupt handlers in the virtual machine monitor;

enabling the virtual machine monitor to intercept I/O accesses by an operating system;

commencing emulation of the I/O device using a state machine;

wherein the virtual machine monitor determines whether the I/O device is performing an I/O sequence, and delays commencing the virtualization until the virtual machine monitor determines that the I/O sequence has completed.

2. The method of claim 1, wherein the computer further includes a CPU, wherein the virtual machine monitor is in control of the CPU prior to the runtime virtualization of the I/O device.

3. The method of claim 1, wherein the virtualization is performed transparently to an operating system.

4. The method of claim 1, wherein the I/O device is compatible with the virtualized I/O device.

5. The method of claim 1, further comprising configuring hardware to trap I/O accesses, and enabling the virtual machine monitor to emulate the I/O device in response to the trapped I/O accesses.

6. The method of claim 5, wherein the virtual machine monitor uses memory management to trap the I/O accesses.

7. The method of claim 1, wherein the runtime virtualization includes using the virtual machine monitor to emulate I/O device interrupts.

8. The method of claim 1, wherein I/O device interrupts are directed to the operating system prior to the runtime virtualization of the I/O device; and wherein the I/O device interrupts are directed to the virtual machine monitor during and after the virtualization of the I/O device.

9. The method of claim 1, wherein the virtual machine monitor temporarily pauses the I/O sequence by emulating the I/O device as being busy.

10. The method of claim 1, further comprising devirtualizing the I/O device at runtime following the runtime virtualization.

11. In a computer including an I/O device, a method comprising:
using a virtual machine monitor to commence virtualization of the I/O device at runtime, wherein runtime is a period of execution in the computer after boot and before shutdown of the computer, wherein the I/O device has multiple modes of operations;
the virtual machine monitor determining the mode of the I/O device prior to commencing the virtualization; and
the virtual machine monitor restoring the determined mode of operation after the virtualization, wherein virtualization of the I/O device is performed by:
redirecting interrupts for the I/O device to interrupt handlers in the virtual machine monitor;
enabling the virtual machine monitor to intercept I/O accesses by an operating system; and
commencing emulation of the I/O device using a state machine.

12. The method of claim 11, wherein the virtual machine monitor commences the virtualization between I/O sequences.

13. The method of claim 12, wherein the virtual machine monitor uses the intercepted I/O accesses to update the state machine, whereby the state machine reflects a state of the I/O device; and wherein the virtual machine monitor examines transitions in the state machine to determine whether the I/O device is in the middle of an I/O sequence.

14. The method of claim 11, further comprising the virtual machine monitor commencing the virtualization during an I/O sequence.

15. In a computer including hardware, a method comprising:
running a virtual machine monitor on the hardware;
running an operating system on the virtual machine monitor,
wherein the hardware includes an I/O device, and the I/O device is already virtualized by the virtual machine monitor; and
devirtualizing the I/O device at runtime, wherein runtime is a period of execution in the computer after boot and before shutdown of the computer, wherein devirtualizing the I/O device is performed by:
waiting for a state machine for the I/O device to reach a particular state and blocking new I/O requests;
draining I/O requests queued by the virtual machine monitor; and
redirecting interrupts for the I/O device to interrupt handlers in the operating system.

16. The method of claim 15, wherein the devirtualization is performed transparently to the operating system.

17. The method of claim 15, wherein the devirtualization includes stopping I/O device emulation at runtime.

18. The method of claim 15, wherein the virtual machine monitor emulates the I/O device prior to devirtualization; and wherein the devirtualization includes allowing the virtual machine monitor to temporarily stop the operating system from commencing a new I/O sequence.

19. The method of claim 18, wherein the virtual machine monitor temporarily stops the operating system by emulating the I/O device as being in a "busy" or "device not ready" state.

20. The method of claim 18, wherein the virtual machine monitor bounds the amount of time the operating system processing is temporarily stopped.

21. The method of claim 18, further comprising:
the virtual machine monitor logging I/O accesses by the operating system to the I/O device during devirtualization, and
replaying the log to the I/O device after devirtualization, wherein the I/O accesses by the operating system are deferred during the devirtualization of the I/O device.

22. The method of claim 15, wherein the virtual machine monitor waits for I/Os initiated by the virtual machine monitor's driver for the I/O device to complete, and for all expected interrupts from the device to arrive, before ceasing device emulation.

23. The method of claim 15, further comprising, after performing the devirtualizing, configuring the hardware so accesses by the operating system to the I/O device no longer trap to the virtual machine monitor.

24. The method of claim 15, wherein the I/O device has multiple modes of operations, the method further comprising:
the virtual machine monitor determining the mode of the I/O device prior to commencing the devirtualization; and
the virtual machine monitor restoring the determined mode of operation after devirtualization.

25. The method of claim 15, further comprising virtualizing the I/O device at runtime again after performing the devirtualizing at runtime.

26. A computer comprising:
hardware including an I/O device; and
computer memory encoded with a virtual machine monitor for running on the hardware and commencing virtualization of the I/O device at runtime, wherein runtime is a period of execution in the computer after boot and before shutdown of the computer, wherein the virtualization of the I/O device is performed by:
redirecting interrupts for the I/O device to interrupt handlers in the virtual machine monitor;
enabling the virtual machine monitor to intercept I/O accesses by an operating system;
commencing emulation of the I/O device using a state machine,
wherein the virtual machine monitor is configured to determine whether the I/O device is performing an I/O sequence, and to delay commencing the virtualization until the virtual machine monitor determines that the I/O sequence has completed.

27. The computer of claim 26, wherein the I/O device is compatible with the virtualized I/O device.

28. The computer of claim 26, wherein the hardware is configured to trap I/O accesses, and the virtual machine monitor is enabled to emulate the I/O device in response to the trapped I/O accesses.

29. The computer of claim 28, wherein the virtual machine monitor is configured to use memory management to trap the I/O accesses.

30. The computer of claim 26, wherein the virtual machine monitor is configured to temporarily pause the I/O sequence by emulating the I/O device as being busy.

31. The computer of claim 26, wherein the runtime virtualization includes using the virtual machine monitor to emulate I/O device interrupts.

32. A computer comprising:
hardware including an I/O device; and
computer memory encoded with a virtual machine monitor for devirtualizing the I/O device at runtime, wherein runtime is a period of execution in the computer after boot and before shutdown of the computer, wherein devirtualization of the I/O device is performed by:
waiting for a state machine for the I/O device to reach a particular state and blocking new I/O requests;
draining I/O requests queued by the virtual machine monitor; and
redirecting interrupts for the I/O device to interrupt handlers in the operating system.

33. The computer of claim 32, wherein the virtual machine monitor is configured to emulate the I/O device prior to commencing the devirtualization; and wherein the virtual machine is configured to commence the devirtualization by temporarily stopping an operating system running on the virtual machine monitor from commencing a new I/O sequence.

34. The computer of claim 33, wherein the virtual machine monitor is configured to temporarily stop the operating system by emulating the I/O device as being in a "busy" or "device not ready" state.

35. The computer of claim 33, wherein the virtual machine monitor is configured to bound the amount of time the operating system processing is temporarily stopped.

36. The computer of claim 33, wherein the virtual machine monitor is configured to wait for I/Os initiated by a virtual machine monitor driver for the I/O device to complete, and for all expected interrupts from the I/O device to arrive, before ceasing device emulation.

37. The computer of claim 32, wherein the virtual machine monitor is configured to log I/O accesses by an operating system to the I/O device during devirtualization, and to replay the log to the I/O device after devirtualization.

38. The computer of claim 32, wherein the hardware is configured so operating system accesses to the I/O device no longer trap to the virtual machine monitor after the devirtualization.

39. The computer of claim 32, wherein the I/O device has multiple modes of operations; wherein the virtual machine monitor is configured to determine the mode of the I/O device prior to commencing the devirtualization; and wherein the virtual machine monitor is configured to restore the determined mode of operation after the I/O device has been devirtualized.

40. The computer of claim 32, wherein the virtual machine monitor is configured to further virtualize the I/O device after having devirtualized the I/O device at runtime.

41. An article for a computer including an I/O device, the article comprising computer-readable memory encoded with a virtual machine monitor for causing the computer to commence virtualization of the I/O device at runtime, wherein runtime is a period of execution in the computer after boot and before shutdown of the computer, wherein virtualization of the I/O device is performed by:
redirecting interrupts for the I/O device to interrupt handlers in the virtual machine monitor;
enabling the virtual machine monitor to intercept I/O accesses by an operating system;
commencing emulation of the I/O device using a state machine,
wherein the virtual machine monitor determines whether the I/O device is performing an I/O sequence, the virtual machine monitor delaying the commencement of the virtualization until the virtual machine monitor determines that the I/O sequence has completed.

42. The article of claim 41, wherein the virtualization includes commencing I/O device emulation at runtime.

43. The article of claim 42, wherein the virtual machine monitor configures the hardware to trap I/O accesses, and enables the virtual machine monitor to emulate the I/O device in response to the trapped I/O devices.

44. The article of claim 43, wherein the virtual machine monitor uses memory management to trap the I/O accesses.

45. The article of claim 41, wherein the virtual machine monitor temporarily pauses the I/O sequence by emulating the I/O device as being busy.

46. The article of claim 41, wherein the virtual machine monitor emulates I/O device interrupts during the runtime virtualization.

47. An article for a computer including an I/O device, the article comprising computer-readable memory encoded with a virtual machine monitor for causing the computer to devirtualize the I/O device at runtime, wherein runtime is a period of execution in the computer after boot and before shutdown of the computer, wherein devirtualizing the I/O device is performed by:
waiting for a state machine for the I/O device to reach a particular state and blocking new I/O requests;
draining I/O requests queued by the virtual machine monitor; and
redirecting interrupts for the I/O device to interrupt handlers in the operating system.

48. The article of claim 47, wherein the devirtualization includes ceasing emulation of the I/O device at runtime.

49. The article of claim 48, wherein the devirtualization includes temporarily stopping an operating system running on the virtual machine monitor from commencing a new I/O sequence.

50. The article of claim 49, wherein the virtual machine monitor temporarily stops the operating system by emulating the I/O device as being in a "busy" or "device not ready" state.

51. The article of claim 49, wherein the virtual machine monitor bounds the amount of time the operating system processing is temporarily stopped.

52. The article of claim 48, wherein the virtual machine monitor waits for I/Os initiated by a virtual machine monitor driver for the I/O device to complete, and for all expected interrupts from the I/O device to arrive, before ceasing device emulation.

53. The article of claim 47, wherein the virtual machine monitor logs I/O accesses by an operating system to the I/O device during devirtualization, and replays the log to the I/O device after devirtualization.

54. The article of claim 47, wherein the virtual machine monitor, configures the hardware so operating system accesses to the I/O device do not trap to the virtual machine monitor.

55. The article of claim 47, wherein the I/O device has multiple modes of operations; and wherein the virtual machine monitor determines the mode of the I/O device prior to commencing devirtualization; and restore the determined mode of operation after the I/O device has been devirtualized.

56. The article of claim 47, wherein the virtual machine monitor causes the computer to further virtualize the I/O device after having devirtualized the I/O device at runtime.

* * * * *